United States Patent

Yoshizawa et al.

(10) Patent No.: US 7,527,410 B2
(45) Date of Patent: May 5, 2009

(54) BACKLIGHT UNIT

(75) Inventors: Kenichi Yoshizawa, Tokyo (JP);
 Masaru Miyashita, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/153,436

(22) Filed: May 19, 2008

(65) Prior Publication Data

US 2008/0225526 A1 Sep. 18, 2008

Related U.S. Application Data

(63) Continuation of application No. PCT/JP2007/051719, filed on Feb. 1, 2007.

(51) Int. Cl.
 *F21V 7/04* (2006.01)
(52) U.S. Cl. .................. 362/615; 362/294; 362/309
(58) Field of Classification Search .............. 362/158, 362/267, 350, 362, 363, 431, 457, 294, 309
 See application file for complete search history.

(56) References Cited

U.S. PATENT DOCUMENTS 6,984,046 B2 * 1/2006 Abe et al. .................. 359/457
 7,374,328 B2 * 5/2008 Kuroda et al. .............. 362/620

FOREIGN PATENT DOCUMENTS

| JP | 2000-284268 | 10/2000 |
|----|-------------|---------|
| JP | 2004-325958 | 11/2004 |
| JP | 2006-208930 | 8/2006 |
| WO | WO 2006/080530 A1 | 8/2006 |

OTHER PUBLICATIONS

Notification of Reasons for Rejection mailed Sep. 11, 2007 for Patent Application No. 2007-519550 (3 pages) (English language translation consisting of 3 pages).
Decision of Rejection mailed Dec. 11, 2007 in Patent Application No. 2007-519550 (2 pages) (English language translation consisting of 2 pages).
Decision of Patent mailed Mar. 25, 2008 in Patent Application No. 2007-519550 (3 pages) (English language translation consisting of 2 pages).
English translation of International Search Report, mailed Feb. 27, 2007 and issued in corresponding International Patent Application No. PCT/JP2007/051719.
International Search Report (PCT/ISA/210) of International Application PCT/JP2007/051719 (mailed on Feb. 27, 2007).

* cited by examiner

*Primary Examiner*—John A Ward
(74) *Attorney, Agent, or Firm*—Staas & Halsey LLP (57) ABSTRACT

An optical sheet includes a light scattering layer which scatters light made incident from an incident surface to an emission surface side and a plurality of light reflecting portions which reflect light scattered by the light scattering layer to the light scattering layer side. The optical sheet further includes a plurality of light transmitting portions constituted of an air layer for transmitting the scattered light to lenticular sheets. The plurality of light transmitting portions are arranged along a longitudinal direction so as to form a convex portion with respect to a non-lens surface. Consequently, the light reflecting portions and the light transmitting portions are disposed alternately in stripes along an arrangement direction.

2 Claims, 7 Drawing Sheets

BACKLIGHT UNIT

CROSS REFERENCE TO RELATED APPLICATIONS

This is a Continuation Application of PCT Application No. PCT/JP2007/051719, filed Feb. 1, 2007, which was published under PCT Article 21(2) in Japanese.

BACKGROUND OF THE INVENTION

1. Field of the Invention

The present invention relates to a backlight unit which illuminates a liquid crystal panel from its rear surface, in which display devices for specifying a display pattern corresponding to transmission/non-transmission or transparent/scattering state of each pixel are arranged.

2. Description of the Related Art

In recent years, a liquid crystal display unit using TFT-type liquid crystal panel or STN-type liquid crystal panel has been commercialized around mainly color notebook personal computer (PC) in the OA field.

Such a liquid crystal display unit has employed a method in which a light source is disposed in the back (observer's side) of the liquid crystal panel, which is illuminated with light from this light source, called backlight unit method.

As the backlight unit employed in this kind of the backlight unit method, if roughly classified, "light guide method" (so-called edge light method) in which light from a light source lamp such as a cold cathode tube (CCFT) is reflected multiply within a flat light guide plate composed of acrylic resin having excellent optical transparency and "direct type" using no light guide plate are available.

Figure 1:
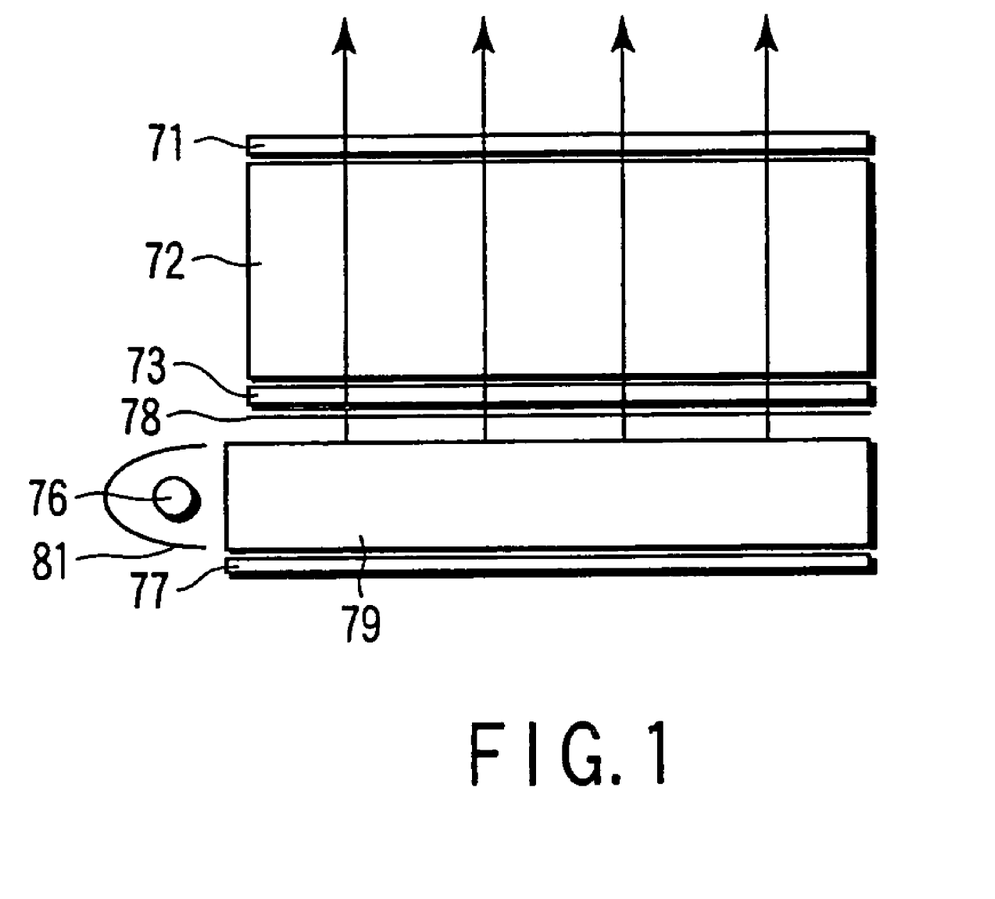
FIG. 1 is an explanatory diagram showing an example of the structure of a liquid crystal display unit according to a prior art.

As the liquid crystal unit mounted with a light guide method backlight unit, for example, the one shown in FIG. 1 is generally known.

A liquid crystal panel 72 sandwiched between polarizing plates 71, 73 is provided on the top and a substantially rectangular light guide plate 79 composed of transparent base material such as polymethyl methacrylate (PMMA) or acrylic is provided on the bottom while a light scattering film (scattering layer) 78 is provided on the top face (light outgoing side) of the light guide plate.

A scattering reflection pattern portion for scattering and reflecting light introduced to the light guide plate 79 effectively to be uniform in the direction of the liquid crystal panel 72 is provided on the bottom of this light guide plate 79 by printing (not shown) and a reflecting film (reflecting layer) 77 is provided on the bottom of the scattering reflection pattern portion.

The light guide plate 79 is provided with a light source lamp 76 at a side end portion thereof and a lamp reflector 81 having a high reflectance is provided such that it covers the rear face side of the light source lamp 76 in order to impinge light from the light source lamp 76 effectively into the light guide plate 79. The scattering reflection pattern portion is formed by printing a mixture of white titanium dioxide ($TiO_2$) powder dissolved in transparent adhesive agent solution in a predetermined pattern, for example, a dot pattern followed by drying so as to supply light incident upon the light guide plate 79 with directivity to introduce the light to the light outgoing face side, thereby achieving high brightness.

Figure 2:
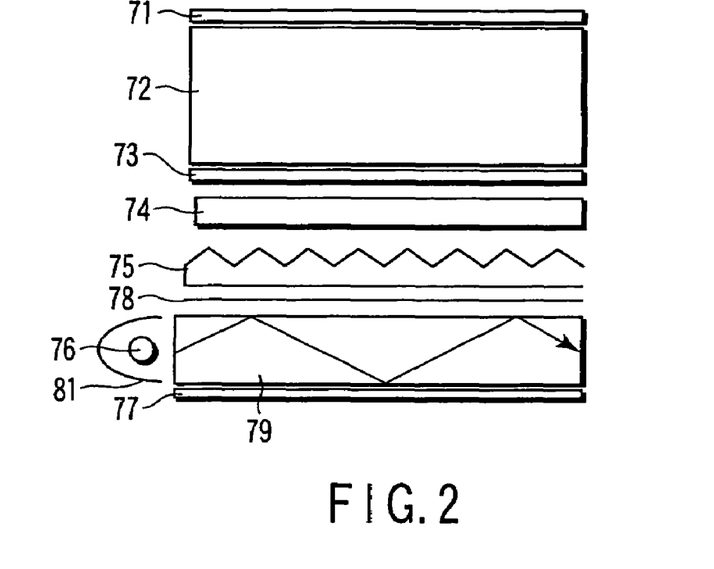
FIG. 2 is an explanatory diagram showing an example of the structure of the liquid crystal display unit according to the prior art.

Further, recently, it has been proposed to provide prism films (prism layer) 74, 75 having light condensing function between the scattering film 78 and the liquid crystal panel 72 as shown in FIG. 2 in order to achieve high brightness by improving light use efficiency. The prism films 74, 75 concentrate light sent from a light outgoing face of the light guide plate 79 and scattered by the scattering film 78 highly effectively onto an effective display area of the liquid crystal panel 72.

However, in the unit shown in FIGS. 1 and 2, control of view angle depends only on the scattering property of the scattering film 78 and that control is difficult to do, so that there is such an inevitable characteristic that a central portion on the front side of the display is bright while it becomes darker as it goes to the peripheral portion. Thus, reduction of brightness when the liquid crystal display face is seen from sideway is large thereby reducing use efficiency of light.

In the unit using the prism film shown in FIG. 2, not only is the reduction of the amount of light due to absorption of the film large but also cost is increased by an increase in the number of members, because two prism films are necessary.

On the other hand, the direct type is employed by a display unit such as a large liquid crystal TV which disables use of the light guide plate.

Figure 3:
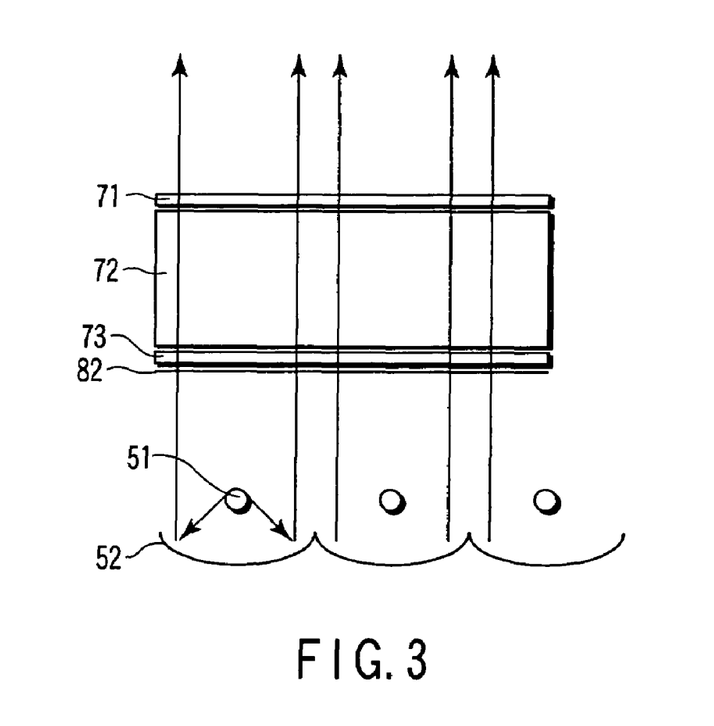
FIG. 3 is an explanatory diagram showing an example of the structure of the liquid crystal display unit according to the prior art.

As the direct-type liquid crystal display unit, the one shown in FIG. 3 has been generally known. The liquid crystal panel 72 sandwiched between the polarizing plates 71, 73 is provided on the top and then, light emitted from the light source 51 composed of a fluorescent tube or the like and scattered by an optical sheet like a scattering film 82 is gathered to an effective display area of the liquid crystal panel 72 highly efficiently. To use the light from the light source 51 effectively as illumination, a reflector 52 is disposed in the back of the light source 51.

However, also in the unit shown in FIG. 3, the control on view angle depends only on the scattering property of the scattering film 82 and that control is difficult to do, so that there is such an inevitable characteristic that the central portion on the front side of the display is bright while it becomes darker as it goes to the periphery. For this reason, reduction of brightness when the liquid crystal display is seen from sideway is large thereby inducing reduction of the use efficiency of light. Further, in the case of using the prism film, two pieces of the prism films are needed, so that not only is reduction of the quantity of light due to absorption of the film large, but also cost is increased due to an increase in the number of members.

If an interval of the light sources 51 is too large, unevenness in brightness likely occurs on the screen and the number of the light sources 51 cannot be reduced, thereby inducing increases in consumption power and cost.

In such a liquid crystal display unit, light weight, low consumption power, high brightness and thin structure are demanded strongly as market needs and accompanied by this, the backlight unit to be mounted on the liquid crystal display unit is demanded to have properties of light weight, low consumption power and high brightness.

Particularly, in the color liquid crystal display unit being developed progressively in recent years, the panel transmission ratio of the liquid crystal panel is extremely lower than a liquid crystal panel corresponding to monochrome and thus, it is indispensable to improve the brightness of the backlight unit in order to obtain the low power consumption of the unit itself.

However, the above-described conventional unit cannot meet the demands for high brightness and low power consumption sufficiently, and a user demands for development of a backlight unit which can realize a liquid crystal display unit having properties of low price, high brightness, high display quality and low power consumption.

In view of the above-described circumstances, this applicant has proposed a liquid crystal display unit having a liquid crystal panel and light source means for illuminating this liquid crystal panel with light from the rear side, this light source means including a lens layer for introducing light from the light source to the liquid crystal panel and the liquid crystal display unit further including a light shielding portion containing an opening in the vicinity of the focal plane in the lens layer, as described in for example, Jpn. Pat. Appln. KOKAI Publication No. 2000-284268.

The aforementioned Jpn. Pat. Appln. KOKAI Publication No. 2000-284268 has disclosed a structure in which a lens sheet having the light shielding portion is disposed between the liquid crystal panel and the backlight unit and in FIGS. 4 to 6, the lens sheet has a uneven structure in which the lens portion is constructed on the liquid crystal side.

As for the operation and effect of interposing the lens sheet, this has an uneven structure in which the scattering property possessed by light emitted from the light guide plate is modulated by the lens action so as to construct a lens portion on the liquid crystal panel side.

The operation and effect of interposing the aforementioned lens sheet exists in that lights can be emitted toward the liquid crystal panel side by modulating the scattering property possessed by light emitted from the light guide plate by the lens action.

Additionally, due to formation of the light shielding portion having an opening portion at a specific location, the quantity of light incident on pixels of the liquid crystal panel can be increased selectively, so that the use efficiency of the backlight is improved and further, the view field area of display light can be controlled by controlling the shape of the opening.

BRIEF SUMMARY OF THE INVENTION

By the way, the liquid crystal display unit for use in a liquid crystal TV or a PC monitor is used continuously for a longer period than a mobile phone and mobile terminals. Additionally, recently, the liquid crystal display unit for use in the mobile phone or mobile terminal is expected to be used continuously for a longer period than conventionally due to employment of energy saving design.

If the liquid crystal display unit is used continuously for a longer period, the optical sheet for use in the backlight unit can be heated to high temperatures due to influences of heat radiated from a light source so as to produce warping or peeling due to deformation by heat, so that the quality of an image displayed by the liquid crystal display unit might be dropped.

The present invention has been accomplished in view of these circumstances and an object of the invention is to provide a backlight unit in which, even if the liquid crystal display unit is used continuously for a long period, warping or peeling due to deformation by heat of the optical sheet is prevented so as to inhibit the quality of an image from dropping.

To achieve the above-described object, the present invention takes the following measures.

That is, a first aspect of the present invention is a backlight unit comprising a light source and an optical sheet which supplies light from the light source to a display. The optical sheet further comprises: a light scattering layer; a plurality of light reflecting portions in stripes provided on a non-incident surface of the light scattering layer; a light transmitting portion disposed between the two light reflecting portions adjacent to each other; and lenticular sheets. The lenticular sheets are formed in stripes along a longitudinal direction of a unit of the light reflecting portions and include a lens portion in which a plurality of unit convex cylindrical lenses are arranged in parallel with each other on the light reflecting portions and the light transmitting portions by the side of the display, and a non-lens surface which is a surface on an opposite side to the lens portion and on which light transmitted by the light transmitting portion is made incident, the plurality of unit convex cylindrical lenses corresponding to each of the light transmitting portions one by one, a perpendicular line from an apex of the corresponding unit convex cylindrical lens to the non-lens surface of the cylindrical lens including the light transmitting portion. Further, of both ends of each light transmitting portion, at least one side end face is released.

A second aspect of the present invention is a backlight unit comprising a light source and an optical sheet which supplies light from the light source to a display. The optical sheet further comprises: a light scattering layer which scatters light from the light source, incident from an incident surface, to an emission surface side which is a non-incident surface; a plurality of light reflecting portions in stripes provided on a non-incident surface of the light scattering layer; a light transmitting portion disposed between the two light reflecting portions adjacent to each other; and lenticular sheets. The lenticular sheets are formed in stripes along a longitudinal direction of a unit of the light reflecting portions and include a lens portion in which a plurality of unit convex cylindrical lenses are arranged in parallel with each other on the light reflecting portions and the light transmitting portions by the side of the display and a non-lens surface which is a surface on an opposite side to the lens portion and on which light transmitted by the light transmitting portion is made incident, the plurality of unit convex cylindrical lenses corresponding to each of the light transmitting portions one by one. The light transmitting portion is composed of an air layer in which, of both ends of the light transmitting portion, at least one side end face is released, transmits light scattered by the light scattering layer and allows the light to be made incident upon each corresponding unit convex cylindrical lens of the light transmitting portion, and is provided at a position in which the incident light is refracted by the plurality of unit convex cylindrical lenses and emitted from a front side of the display.

According to a third aspect of the present invention, in the backlight unit according to the first or second aspect, when both ends of the light transmitting portion are released, a pressure loss $\Delta P$ of air flowing in the light transmitting portion is $0[Pa]<\Delta P<7\times10^3[Pa]$.

According to a fourth aspect of the present invention, in the backlight unit according to the first or second aspect, when one end of the light transmitting portion is released, a pressure loss $\Delta P$ of air flowing in the light transmitting portion is $0[Pa]<\Delta P<4\times10^3[Pa]$.

According to a fifth aspect of the present invention, in the backlight unit according to any one of the first to fourth aspects, an arrangement pitch of the plurality of unit convex cylindrical lenses disposed in parallel to each other is $50\times10^{-6}$ [m] or more to $200\times10^{-6}$ [m] or less.

DETAILED DESCRIPTION OF THE INVENTION

The best mode for carrying out the present invention will be described with reference to the drawings.

Figure 4:
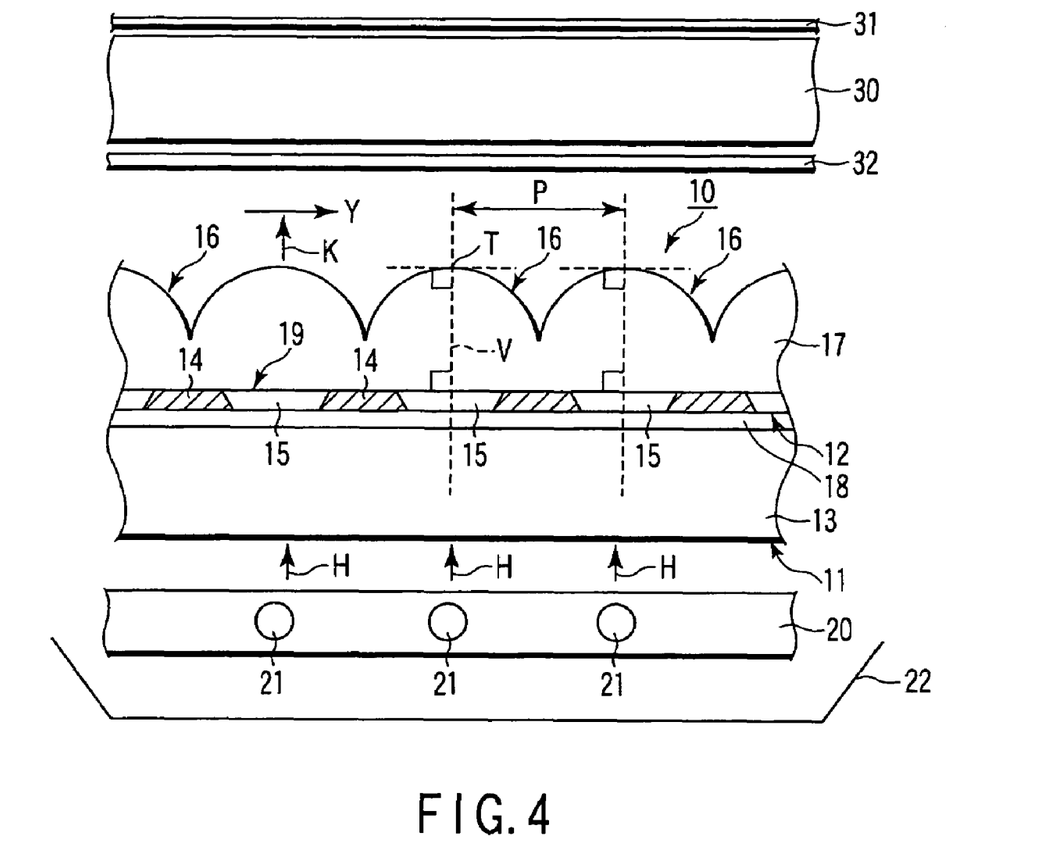
FIG. 4 is a side view showing an example of the backlight unit according to an embodiment of the present invention.

FIG. 4 is a side view showing an example of the backlight unit according to the embodiment of the present invention. That is, the backlight unit according to the embodiment of the present invention includes a plurality of cylindrical light sources 21 accommodated in a lamp house 20, and an optical sheet 10 for supplying light H from the respective light sources 21 to a liquid crystal panel 30 sandwiched between polarizing plates 31, 32. In the meantime, reference numeral 22 denotes a light reflecting plate disposed in the back of the plurality of the light sources 21.

Figure 6:
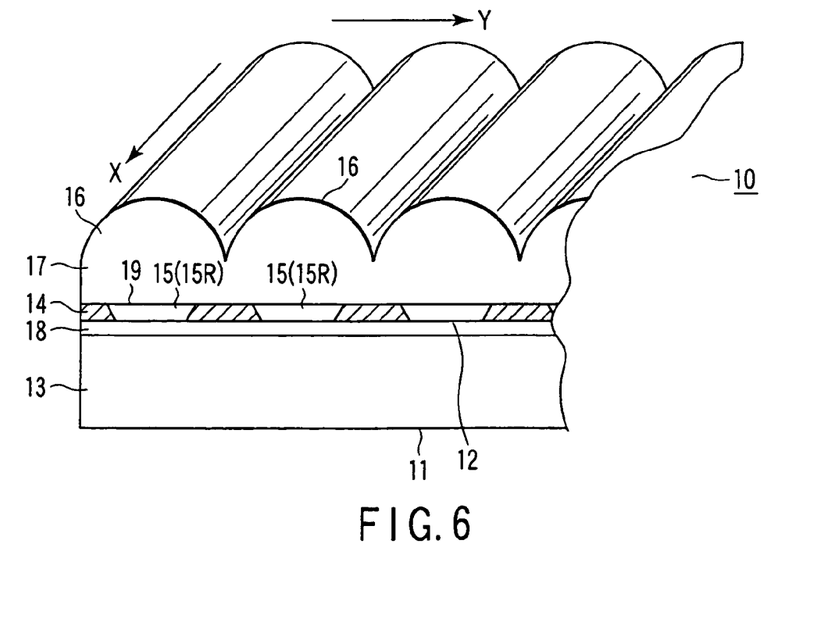
FIG. 6 is a perspective view showing an example of the structure of an optical sheet.

FIG. 6 is a perspective view showing an example of the structure of the optical sheet 10.

This optical sheet 10 includes a light scattering layer 13 for scattering light H incident from an incident face 11 to an emission face 12 side which is a non-incident face side.

The light scattering layer 13 contains transparent resin and transparent particles dispersed in the transparent resin and the refraction factor of the transparent resin needs to be different from that of the transparent particle. A difference between the refraction factor of the transparent resin and that of the transparent particle is preferred to be 0.02 or more. If the difference in the refraction factor is smaller than this, no sufficient light scattering property can be obtained. The difference in the refraction factor may be 0.5 or less.

The light scattering layer 13 needs to transmit light incident on the light scattering layer 13 while scattering. Thus, the average particle diameter of the transparent particle contained in the light scattering layer is preferred to be $0.5 \times 10^{-6}$ [m] to $10.0 \times 10^{-6}$ [m]. Preferably, it is $1.0 \times 10^{-6}$ [m] to $5.0 \times 10^{-6}$ [m].

As the transparent resin, for example, it is permissible to use polycarbonate resin, acrylic resin, fluorine acrylic resin, silicone acrylic resin, epoxy acrylate resin, methyl styrene resin and fluorene resin and the like.

As the transparent particle, transparent particle composed of inorganic oxide or transparent particle composed of resin may be used. For example, as the transparent particle composed of inorganic oxide, particles composed of silica or alumina may be used. As the transparent particle composed of resin, acrylic particle, styrene particle, styrene acrylic particle, cross-linked substance thereof; particle of melamine-formalin condensate; fluorine-containing polymer particle such as polytetrafluoroetylene (PTFE), perfluoroalkoxy resin (PFA), tetrafluoroetylene-hexafluoropropylene copolymer (FEP), polyfluoro vinylidene (PVDF), and ethylene-tetrafluoroetylene copolymer (ETFE); silicone resin particle and the like may be exemplified. Two or more kinds of these transparent resins may be mixed.

Then, the sheet-like light scattering layer 13 can be produced by dispersing the transparent particles in the transparent resin followed by extruding. Its thickness is preferred to be 1 to 5 [mm].

If the thickness is less than 1 [mm], the light scattering layer 13 is thin and not strict, and consequently, sags. On the other hand, if it exceeds 5 [mm], the transmission ratio of light from the light source 21 is worsened, which is a disadvantage.

This optical sheet 10 includes a plurality of light reflecting layers 14 in which one face is provided on the emission face 12 side in order to reflect light scattered by the light scattering layer 13 to the light scattering layer 13 side. Further, the optical sheet 10 is provided with a plurality of light transmitting portions 15 which are provided between the two adjacent light reflecting portions 14 in order to transmit light scattered by the light scattering layer 13 to a lenticular sheet 17 which is a light scattering layer side. Only light passing through the light transmitting portion 15 can be focused and introduced to a unit convex cylindrical lens 16.

The light reflecting portion 14 includes the light transmitting portion 15 corresponding to the unit lens of the convex cylindrical lens 16 one to one, which is formed to allow light incident from and scattered by the light scattering layer 13 to pass the light transmitting layer 13 and allows it to impinge on only each corresponding unit convex cylindrical lens 16 by preventing the light passing through the light transmitting layer 14 from impinging upon unit convex cylindrical lenses on both sides of the corresponding unit convex cylindrical lens or further adjacent unit convex cylindrical lenses, the light reflecting portion being formed in stripes. The light transmitting layer 14 has the light transmitting portions formed in stripes on the surface on an opposite side to the lens portion and the convex portions corresponding to the stripes are formed on the surface on an opposite side to the lens portion.

Usually, the light reflecting portion 14 is formed by coating with or transferring ink produced by mixing metallic particles or high refraction factor transparent particles in a dispersed state or laminating with metallic foil.

Figure 5:
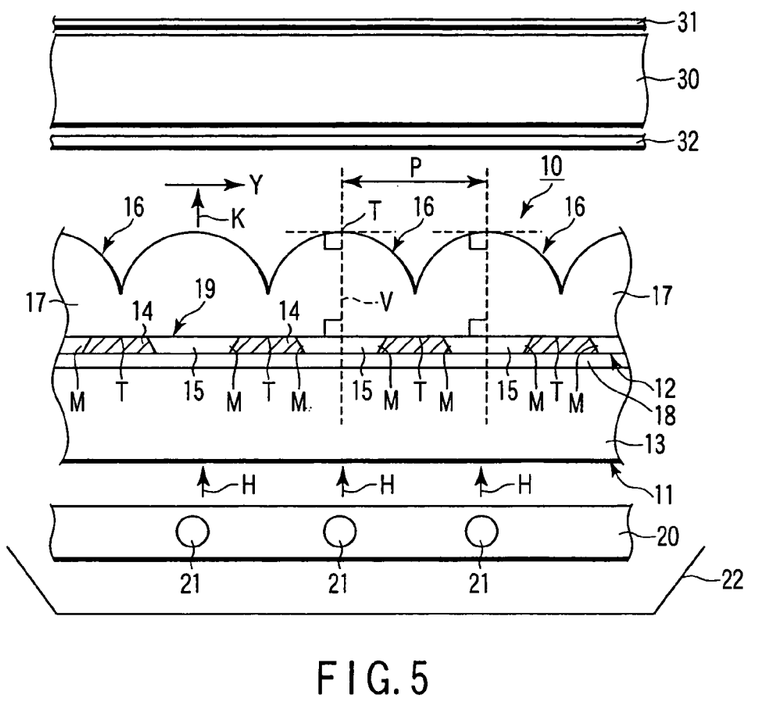
FIG. 5 is a side view showing an example of the backlight unit according to the embodiment of the present invention.

However, the method of producing the light reflecting portion 14 is not limited to the above-described method and for example, as shown in FIG. 5, it may be formed by injection molding such that the lenticular sheet 17 and the light reflecting portion 14 are formed into an integral shape 170 and further, a reflecting film can be formed on only a bottom side T of the light reflecting portion 14 or on the bottom side T and the side face S by applying or printing ink produced by mixing metallic particles or high refraction factor transparent particles in a dispersed state to the bottom side T of the reflecting portion 14.

In this case, the light transmitting layer 14 can be formed more securely as compared with the formation method of the light transmitting layer 13 shown in FIG. 4, so that a more remarkable effect is secured if air is circulated through the light transmitting layer 14.

In this case, by considering a bonding process for the light scattering layer 13 and the light reflecting layer 14, the light reflecting layer 14 may be produced using material produced by mixing ink, in which the metallic particles or high refraction factor transparent particles are mixed in a dispersed state, with adhesive agent.

Next, the optical sheet 10 includes a lens portion in which a plurality of the unit convex cylindrical lenses 16 are arranged in parallel on the liquid crystal panel 30 side and the lenticular sheet 17 having a non-lens face 19 which is a face 19 on an opposite side to the lens portion and on which light transmitted by the light transmitting portion 15 is made incident.

The plural unit convex cylindrical lenses 16 are for example, lenticular lenses and the lenticular sheet 17 is formed by extrusion method, injection molding method or hot press method which are well known in the related art, using polyethylene terephthalate (PET), polycarbonate (PC), polymethylmethacrylate (PMMA), cycloolefin polymer (COP) or the like.

Each of the plurality of the light reflecting portions 14 is formed according to the printing method, transfer method or photolithography method, which are well known in the related art and arranged along the longitudinal direction X of each unit convex cylindrical lens 16 (front-back direction in FIGS. 4 and 5 and X direction in FIG. 6) such that a convex portion is formed with respect to the non-lens face 19. An adhesive layer 18 bonds the plurality of the light reflecting portions 14 with the light scattering layer 13. After applying adhesive agent to the light scattering layer 13, the lenticular sheet 17 can be bonded thereto by pressing or after applying adhesive agent to the light reflecting portion 14 of the lenticular sheet 17, the light scattering layer 13 can be bonded thereto by pressing.

Figure 7A:
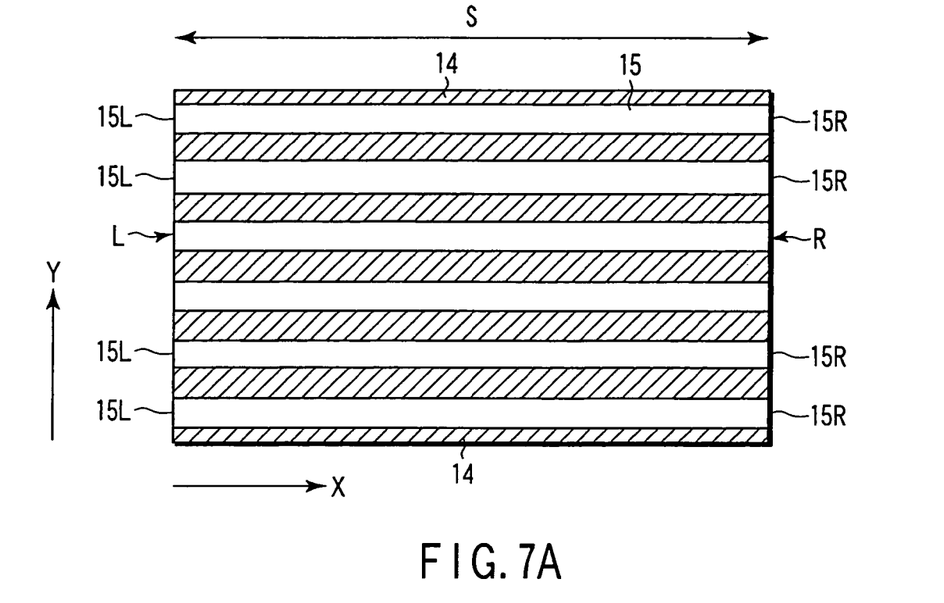
FIG. 7A is a plan view (in the case where a stripe length S is longer than the dimension in an arrangement direction Y) showing an example of the arrangement of a light reflecting portion.
Figure 7B:
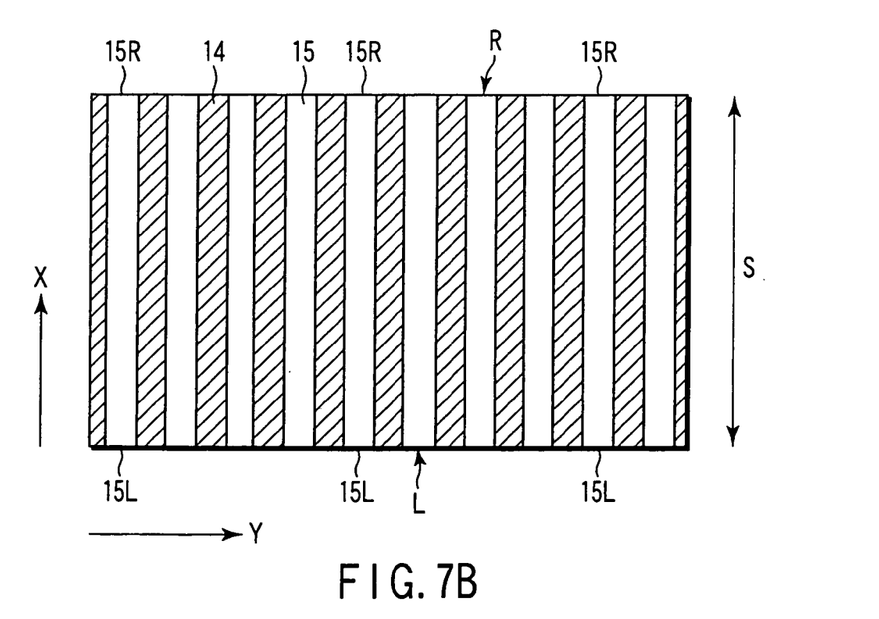
FIG. 7B is a plan view (in the case where the stripe length S is shorter than the dimension in an arrangement direction Y) showing an example of the arrangement of the light reflecting portion.

Consequently, the light reflecting portion 14 and the light transmitting portion 15 are disposed alternately in stripes along an arrangement direction Y in which the plurality of the unit cylindrical lenses 16 are arranged in parallel, as indicated in the perspective view of the optical sheet 10 shown in FIG. 6 and the plan view of the light reflecting portion 14 shown in FIGS. 7A and 7B.

In this optical sheet 10, as described in for example, Jpn. Pat. Appln. KOKAI Publication No. 2006-106197, light H from the light source 21 is scattered by the light scattering layer 13 and only light passing through the light transmitting portion 15 is focused and enters the unit convex cylindrical lens 16 and at the same time, light which cannot enter the unit convex cylindrical lens 16 is reflected repeatedly between the light reflecting portion 14 and the light reflecting plate 22 and finally passed through the light transmitting portion 15. Consequently, light can be recycled without emitting wastefully and by controlling the scattering range while intensifying the use efficiency of light from the light source 21, emission light K can be emitted to the front face from the surface of each unit cylindrical lens 16 and supplied to the liquid crystal panel 30. In the meantime, an arrangement pitch P of the unit convex cylindrical lenses 16 along the arrangement direction Y is specified to for example, $50 \times 10^{-6}$ [m] or more to $200 \times 10^{-6}$ [m] or less from the viewpoint of achieving uniformity of light and prevention of moiré of an image displayed from the liquid crystal panel 30. From the viewpoint of prevention of moiré, preferably, the arrangement direction of the stripes, that is, the arrangement direction Y of the unit convex cylindrical lens 16 is not parallel to the arrangement of pixels of the liquid crystal panel 30 but they are preferred to be deviated in a range of 30 degrees or less.

Further, in the embodiment of the present invention, the optical sheet 10 is so constructed that of both end faces 15R, 15L of each light transmitting portion 15 located at both ends L, R of the stripe, at least one side end face (for example, end face 15R as indicated in FIG. 6) is free.

Figure 8:
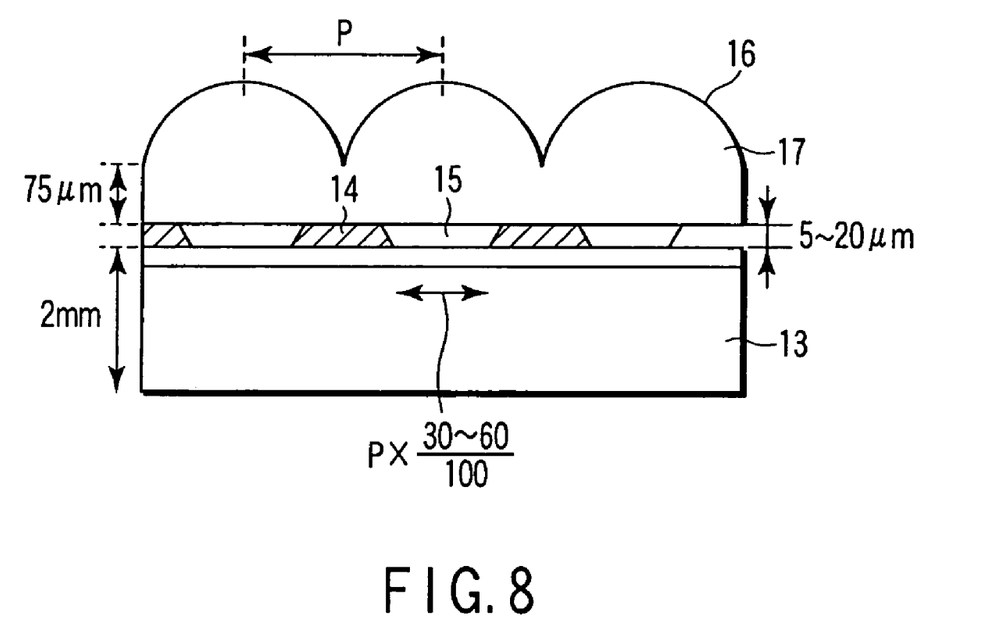
FIG. 8 is a partial side view showing a typical example of the dimension of an end face of a light transmitting portion.

As shown by a typical example in the partial sectional view of FIG. 8, the width of the end face of the light transmitting portion 15 is 30[%] to 60 [%] of the arrangement pitch of the lens and its height is $5 \times 10^{-6}$ [m] to $20 \times 10^{-6}$ [m].

Here, the arrangement pitch P is set to $300 \times 10^{-6}$ [m] or less considering that no moiré is produced for the reason of the relation with the liquid crystal pixel and that the lenticular sheet 17 can be formed by extrusion instead of radiation cured resin.

The reason why the width of the light transmitting portion 15 is set to 30[%] to 60[%] of the arrangement pitch P is that if the length of the light transmitting portion 15 is smaller than 30[%] of the length of the arrangement pitch P, the view angle is narrower and if it is larger than 60[%], the brightness of the front face is too low, so that in either case, the image property is worsened.

The height of the light transmitting portion 15 is $5 \times 10^{-6}$ [m] to $20 \times 10^{-6}$ [m]. If the height of the light transmitting portion 15 is $5 \times 10^{-6}$ [m] or less, when the backlight unit is produced, the adhesive layer 18 for bonding the light scattering layer 13 and the light reflecting portion 14 together buries the light transmitting portion 15, so that no air passes. Further, if the thickness of the light reflecting portion 14 is $5 \times 10^{-6}$ [m] or less, the light reflecting portion 14 contains no transparent particles enough for reflection of light so as to present a poor reflection property.

Conversely, if the height of the light reflecting layer 14 is larger than $20 \times 10^{-6}$ [m], the quantity of transparent particles for reflecting light is increased in the light reflecting portion 14. Consequently, although the light reflection property is sufficient, brittleness of the light reflecting portion 14 is worsened, so that in the manufacturing process or handling, the light reflecting portion 14 is collapsed due to a shock or the like or powder of transparent particles is produced.

An example of the thickness of both the light scattering layer 13 and the adhesive layer 18 is 2 [mm] and an example of the thickness of the lenticular sheet 17 excluding the unit convex cylindrical lens 16 is $75 \times 10^{-6}$ [m]. As described above, the light scattering layer 13 is composed of polycarbonate, polystyrene, MS resin or the like and the linear expansion coefficients of the polycarbonate, polystyrene, and MS resin are $6.7 \times 10^{-5}$ (cm/cm/° C.), $7 \times 10^{-5}$ (cm/cm/° C.), and $7 \times 10^{-5}$ (cm/cm/° C.), respectively. On the other hand, the lenticular sheet 17 is composed of for example, PET and the linear expansion coefficient of the PET is $2.7 \times 10^{-5}$ (cm/cm/° C.), and thus the linear expansion coefficient of the light scattering layer 13 is larger. Thus, if the optical sheet 10 is deformed due to received heat, warping is produced on the lenticular sheet 17 side. However, in the embodiment of the present invention, by releasing at least one side end face of the both end faces 15R, 15L of the light transmitting portion 15 located at the both ends L, R of the stripe, air flow in each light transmitting portion 15 is improved so as to cool the optical sheet 10 effectively. Thus, even if the liquid crystal display unit is used continuously for a long period, warping and peeling of the optical sheet 10 due to deformation by heat is prevented to inhibit the quality of an image from dropping. Basically, although reduction of image quality due to the warping is not noticed regardless of the size of the sectional area of the end face because the air flow in each light transmitting portion 15 is improved, the air flow in each light transmitting portion 15 is worsened slightly if only one side end face is released. If the sectional area of the end face is small, reduction of the image quality due to warping tends to be noticed easily.

[Table 1]

TABLE 1

| Warping test result | End face sectional area small | End face sectional area large |
|---|---|---|
| Both ends free | ○ | ○ |
| One end free | X | ○ |

○: No warping

More specifically, if pressure loss ΔP of air flowing in each light transmitting portion 15 is 0[Pa]<ΔP<7×10³ [Pa], both the end faces 15R, 15L of each light transmitting portion 15 are released. By releasing both the end faces 15R, 15L like this, air flow in the light transmitting portion 15 is improved so as to cool the optical sheet 10 effectively. In the meantime, ΔP=0 indicates an ideal air flow state in which air entering the light transmitting portion 15 receives no friction from the wall face of the light transmitting portion 15 while air itself contains no internal friction.

Generally, as the stripe length S is increased, the air flow in each light transmitting portion 15 is inclined to worsen. Thus, an influence due to deformation by heat is hard to receive if the stripe length S is shorter than the dimension in the arrangement direction Y as shown in FIG. 7B than if the stripe length S is longer than the dimension in the arrangement direction Y as shown in FIG. 7A. For this reason, it is preferable to use the optical sheet 10 in which the stripe length S is shorter than the dimension in the arrangement direction Y as shown in FIG. 7B.

When only one side end face of the light transmitting portion 15 is released, the other side end face is closed, so that air flow in the light transmitting portion 15 is worsened slightly. To avoid deformation by heat of the optical sheet 10, the stripe length S needs to be kept short. In this case, the pressure loss ΔP of air is set to 0[Pa]<ΔP<4×10³[Pa].

Figure 9:
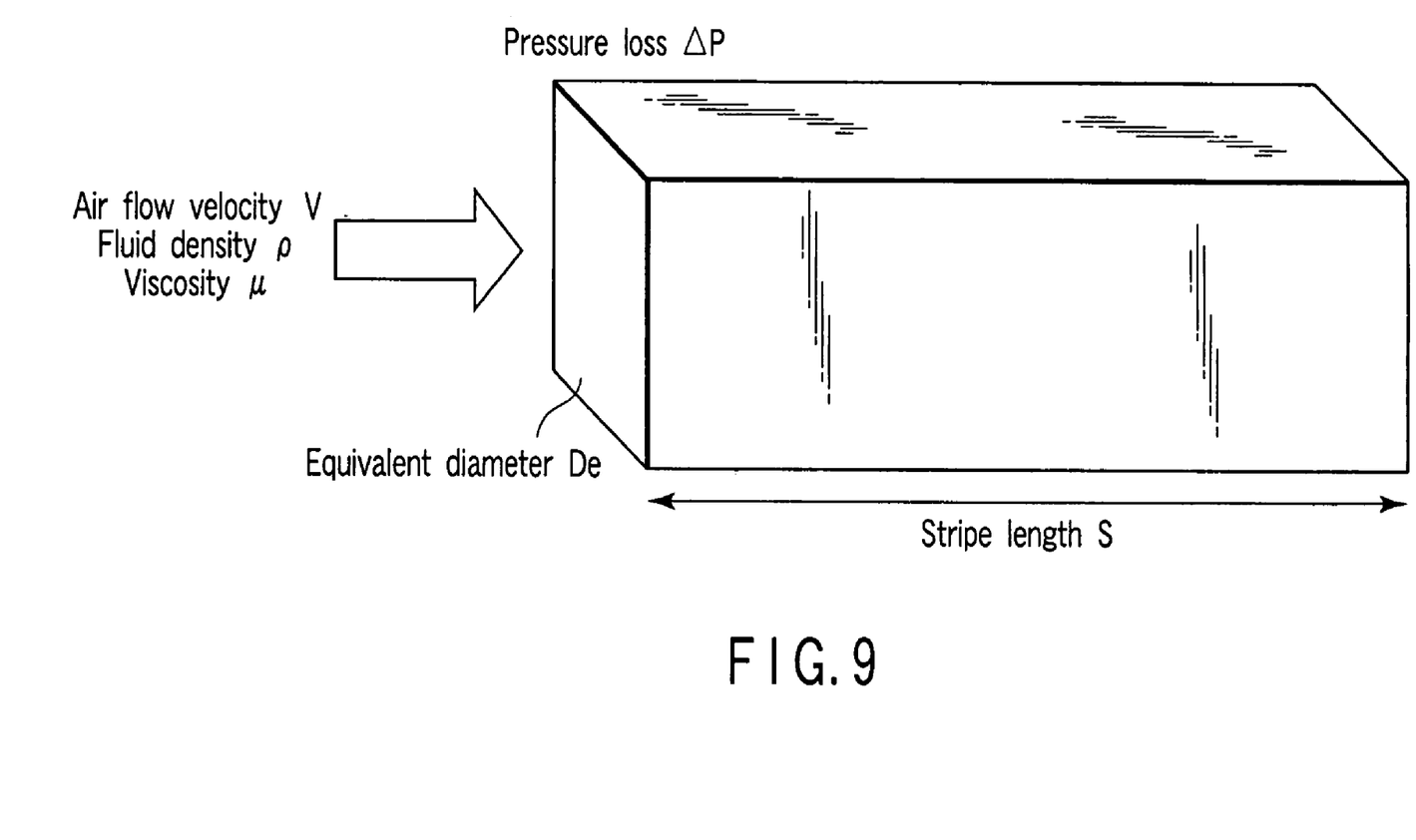
FIG. 9 is a diagram showing a pressure loss model in the light transmitting portion.

The reasons for the stripe length S described above and the pressure loss ΔP allowed thereto will be described with reference to FIG. 9. For air to flow in the air layer of the light transmitting portion 15, the pressure loss ΔP (=P1−P2) which is a difference between the air pressure P1 at an entrance of the air layer, that is, a released end face of the light transmitting portion 15 and pressure P2 inside the air layer, that is, inside the light transmitting portion 15 needs to be more than a specified value, otherwise air in the air layer is not convected sufficiently. Here, if no sufficient air convection is present in the light transmitting portion 15, heat discharge is eliminated, so that the optical sheet 10 is heated to a high temperature and in some cases, it is deformed by heat.

Next, the pressure loss ΔP of air flowing in the light transmitting portion 15 is evaluated using a model equation to a cylinder. However, because the sectional shape at the end face of the light transmitting portion 15 is not circular but rectangular as shown in FIG. 9, the pressure loss ΔP is calculated using an equivalent diameter De of the section of the light transmitting portion 15 obtained by:

4×(sectional area of fluid flow)/(length of the periphery of a solid wall which makes contact with fluid). If the lengths of sides of the rectangle at the end face of the light transmitting portion 15 are assumed to be a and b, the equivalent diameter De is 2ab/(a+b). An average flow velocity of air passing in the air layer is as follows.

[Equation 1]

$$\left.\begin{aligned} \overline{V} &= \frac{1}{\pi r_0^2} \int_0^{r_0} 2\pi r \mu \, dr \\ &= \frac{\Delta P r_0^2}{8 \, \mu L} \\ &= \frac{1}{2} V_{max} \end{aligned}\right\} \quad (1)$$

The pressure loss ΔP is represented as follows by using Hagen-Poiseuille equation. From this, it is made evident that the pressure loss $\Delta P=32 \, \mu S V_{ave}/De^2$.

[Equation 2]

$$\left.\begin{aligned} \Delta P &= \frac{32 \, \mu S V ave}{De^2} \\ &= 32 \, \mu Vave \frac{S}{De^2} \text{(where } Vave = \text{constant)} \end{aligned}\right\} \quad (2)$$

where, in the above-mentioned equations (1) and (2),
ΔP: pressure loss
De: equivalent diameter
$V_{ave}$: average velocity of air
ρ: air density
S: stripe length
$V_{max}$: maximum value of air flow rate
$r_0$: radius in case of a cylinder Next, a backlight unit in which only one side end face was released in the light transmitting portion 15 of the optical sheet 10 was used in displays of various sizes, and warping due to deformation by heat of the optical sheet 10 was observed. Although warping was produced in the case of a display of 32-inch or more, no warping or peeling was noticed in displays smaller than 32 inch. Here, in the case of the 32-inch display, the stripe length S is equal to about 80 [cm].

Therefore, a threshold α for the pressure loss ΔP in the case where the stripe length S is 80 [cm] exists. If the pressure loss ΔP is larger than the threshold α, air convection is insufficient so that warping or peeling can occur.

A calculation method for the threshold α for the pressure loss ΔP in the case where the stripe length S is 80 [cm] by releasing only one side end face of the light transmitting portion 15 is shown here.

By calculating according to the equation (2) using:

Air viscosity μ=18.86×10⁻⁶ [Pa·sec](40° C.)

Average velocity of air Vave=0.06 [m/sec](40° C.)

Equivalent diameter De=2×5×42/(5+42) [×10⁻⁵ m], the pressure loss ΔP=3.6×10³ [Pa] is obtained. By generalizing this numerals, the threshold of ΔP is set to ΔP=4×10³ [Pa].

By the way, the pressure loss ΔP in the case where the stripe length S is 100 [cm] is ΔP=4.5×10³ [Pa], exceeding the aforementioned threshold α=4×10³ [Pa].

Next, a backlight unit in which both the end faces of the light transmitting portion 15 of the optical sheet 10 were released was used in displays of various sizes, and warping due to deformation by heat of the optical sheet 10 was observed. As a result, in the case where it was used in a display of 100 inch which is the maximum screen size of a standard liquid crystal display, no warping or peeling was noticed. In the case of the 100-inch display, the stripe length S corresponds to 300 [cm]. As for the threshold a of the pressure loss $\Delta P$ in this case, as in the case of releasing only one end face of the light transmitting portion 15, by calculating according to the equation (2) using:

Air viscosity $\mu=18.86\times 10^{-6}$ [Pa-sec](40° C.)

Average velocity of air Vave=0.06 [m/sec](40° C.)

Equivalent diameter De=$2\times 5\times 42/(5+42)$ [$\times 10^{-5}$ m], the pressure loss $\Delta P=6.6\times 10^3$ [Pa] is obtained. By generalizing this numerals, the threshold $\alpha$ is set to $7\times 10^3$ [Pa].

As a result of the above-described facts, it is made evident that when the both ends of the light transmitting portion 15 are released, as long as the pressure loss $\Delta P$ is in the range of 0 [Pa]$<\Delta P<7\times 10^3$ [Pa], air convection is sufficient so that no warping or peeling due to deformation by heat of the optical sheet 10 is produced.

By designing the backlight unit of an embodiment of the present invention so that it falls within the threshold a of the pressure loss $\Delta P$, convection of air within the light transmitting portion 15 becomes sufficient so as to accelerate radiation of heat in the optical sheet 10. Consequently, even if the liquid crystal display unit is used continuously for a long period, warping and peeling due to deformation by heat of the optical sheet 10 can be prevented to inhibit image quality from dropping.

Although the best mode for carrying out the present invention has been described with reference to the accompanying drawings, the present invention is not limited to such structures. Those skilled in the art can reach various modifications and corrections in the range of technical philosophy of the invention defined by the scope of claims and it should be understood that those modifications and corrections belong to the technical range of the present invention.

As described above, by providing the backlight unit of the present invention with the light transmitting portion composed of an air layer and designing so that its size is within the threshold of the pressure loss $\Delta P$, air is convected within the light transmitting portion so as to accelerate radiation of heat in the optical sheet. Consequently, even if the liquid crystal display unit is used continuously for a long period, warping and peeling due to deformation by heat of the optical sheet can be prevented to inhibit the image quality from dropping.

What is claimed is:

1. A backlight unit comprising a light source and an optical sheet which supplies light from the light source to a display of a size of 32 inches or larger, wherein:
    the optical sheet further comprises:
    a light scattering layer;
    a plurality of light reflecting portions in stripes provided on a non-incident surface of the light scattering layer;
    light transmitting portions each provided between each adjacent pair of the plurality of light reflecting portions; and
    lenticular sheets formed in stripes along a longitudinal direction of a unit of each of the plurality of light reflecting portions and including a lens portion in which a plurality of unit convex cylindrical lenses are arranged in parallel with each other on the plurality of light reflecting portions and the light transmitting portions by the side of the display, and a non-lens surface on which light transmitting the light transmitting portions is made incident, the plurality of unit convex cylindrical lenses corresponding respectively to the light transmitting portions one by one, perpendicular lines from peaks of the plurality of unit convex cylindrical lenses to the non-lens surfaces thereof including the light transmitting portions,
    wherein both of longitudinal ends of each of the plurality of light transmitting portions are free, the light scattering layer comprises one of polycarbonate, polystyrene and methacryl styrene (MS) resin and has a thickness of 1 mm to 5 mm, a pressure loss $\Delta P$ of air flowing through the light transmitting portions has a relationship of 0 (Pa)$<\Delta P<7\times 10^5$ (Pa), the longitudinal direction is a vertical direction, and the optical sheet has a vertical dimension larger than that of a horizontal direction.

2. A method of cooling a backlight unit comprising a light source and an optical sheet which supplies light from the light source to a display of a size of 32 inches or larger, wherein:
    the optical sheet further comprises:
    a light scattering layer;
    a plurality of light reflecting portions in stripes provided on a non-incident surface of the light scattering layer;
    light transmitting portions each provided between each adjacent pair of the plurality of light reflecting portions; and
    lenticular sheets formed in stripes along a longitudinal direction of a unit of each of the plurality of light reflecting portions and including a lens portion in which a plurality of unit convex cylindrical lenses are arranged in parallel with each other on the plurality of light reflecting portions and the light transmitting portions by the side of the display, and a non-lens surface on which light transmitting the light transmitting portions is made incident, the plurality of unit convex cylindrical lenses corresponding respectively to the light transmitting portions one by one, perpendicular lines from peaks of the plurality of unit convex cylindrical lenses to the non-lens surfaces thereof including the light transmitting portions,
    both of longitudinal ends of each of the plurality of light transmitting portions being formed free so that air can go in or out the light transmitting portions, the longitudinal direction being set as a vertical direction, the optical sheet being formed to have a vertical dimension larger than that of a horizontal direction, and the light scattering layer being formed to comprise one of polycarbonate, polystyrene and methacryl styrene (MS) resin and have a thickness of 1 mm to 5 mm,
    wherein when the backlight unit generates heat due to the light supplied from the light source, air is allowed to flow through the light transmitting portions at a pressure loss $\Delta P$ in a relationship of 0 (Pa)$<P<7\times 10^5$ (Pa), thereby cooling the backlight unit.

* * * * *

UNITED STATES PATENT AND TRADEMARK OFFICE
CERTIFICATE OF CORRECTION

| | |
|---|---|
| PATENT NO. | : 7,527,410 B2 |
| APPLICATION NO. | : 12/153436 |
| DATED | : May 5, 2009 |
| INVENTOR(S) | : Kenichi Yoshizawa et al. |

It is certified that error appears in the above-identified patent and that said Letters Patent is hereby corrected as shown below:

Column 12, Line 59, change "<P" to --<ΔP--.

Signed and Sealed this

Fourth Day of August, 2009

JOHN DOLL
*Acting Director of the United States Patent and Trademark Office*